United States Patent [19]

Immell et al.

[11] Patent Number: 5,096,384

[45] Date of Patent: Mar. 17, 1992

[54] PLASTIC FAN BLADE FOR INDUSTRIAL COOLING TOWERS AND METHOD OF MAKING SAME

[75] Inventors: William F. Immell, Mission; Larry F. Burdick, Olathe; Scott E. Mayes, Lenexa, all of Kans.; Harry J. Bendick, Granville, Ohio

[73] Assignee: The Marley Cooling Tower Company, Mission, Kans.

[21] Appl. No.: 558,710

[22] Filed: Jul. 27, 1990

[51] Int. Cl.$^5$ .................. B64C 11/20; B64C 27/46
[52] U.S. Cl. ...................... 416/229 R; 416/230; 416/239; 29/889.6; 29/889.71; 156/172; 156/245; 264/257
[58] Field of Search ............... 416/223 R, 226, 229 R, 416/229 A, 230 R, 230 A, 239; 29/889.6, 889.61, 889.7, 889.71; 156/172, 245; 264/257

[56] References Cited

U.S. PATENT DOCUMENTS

| | | | |
|---|---|---|---|
| 2,276,262 | 3/1942 | Caldwell et al. | 29/889.6 |
| 2,767,461 | 10/1956 | Lebold et al. | 416/229 R |
| 3,321,019 | 5/1967 | Dmitroff et al. | 416/230 A |
| 3,647,317 | 3/1972 | Furlong et al. | 416/229 R |
| 3,873,654 | 3/1975 | Smith | 156/245 |

Primary Examiner—Edward K. Look
Assistant Examiner—Christopher M. Verdier
Attorney, Agent, or Firm—Hovey, Williams, Timmons & Collins

[57] ABSTRACT

A molded, composite, airfoil-defining, synthetic resin blade for large diameter cooling tower fans is disclosed wherein a moderately dense synthetic resin foam core is first formed that is generally of the same size and shape as the final desired blade. A shank embedded in the foam core extends outwardly from the end of the blade that is adapted to be fastened to the fan hub. A skin of fiberglass reinforced synthetic resin material is placed over the foam core with the thickness of the skin being greatest at the hub end of the blade and especially around the shank. The foam core with the skin thereon is molded into the final desired configuration thereof under pressure and temperature conditions such that the core is compressed and the thickness reduced to an extent correlated with the thickness of the synthetic resin skin on opposite faces thereof. Compression of the core enhances conversion of the fiberglass reinforced synthetic resin layers into a laminar monolithic skin by virtue of curing of the synthetic resin skin between the compressed core and the mold. The core is provided with stepped areas on opposite sides of the core which increase in height in a direction away from the shank. A sufficient number of pre-prepared, flexible sheets of fiberglass reinforced resin material are placed over the stepped areas to substantially fill the space between the mold and said stepped areas of the core during curing of the resin.

41 Claims, 8 Drawing Sheets

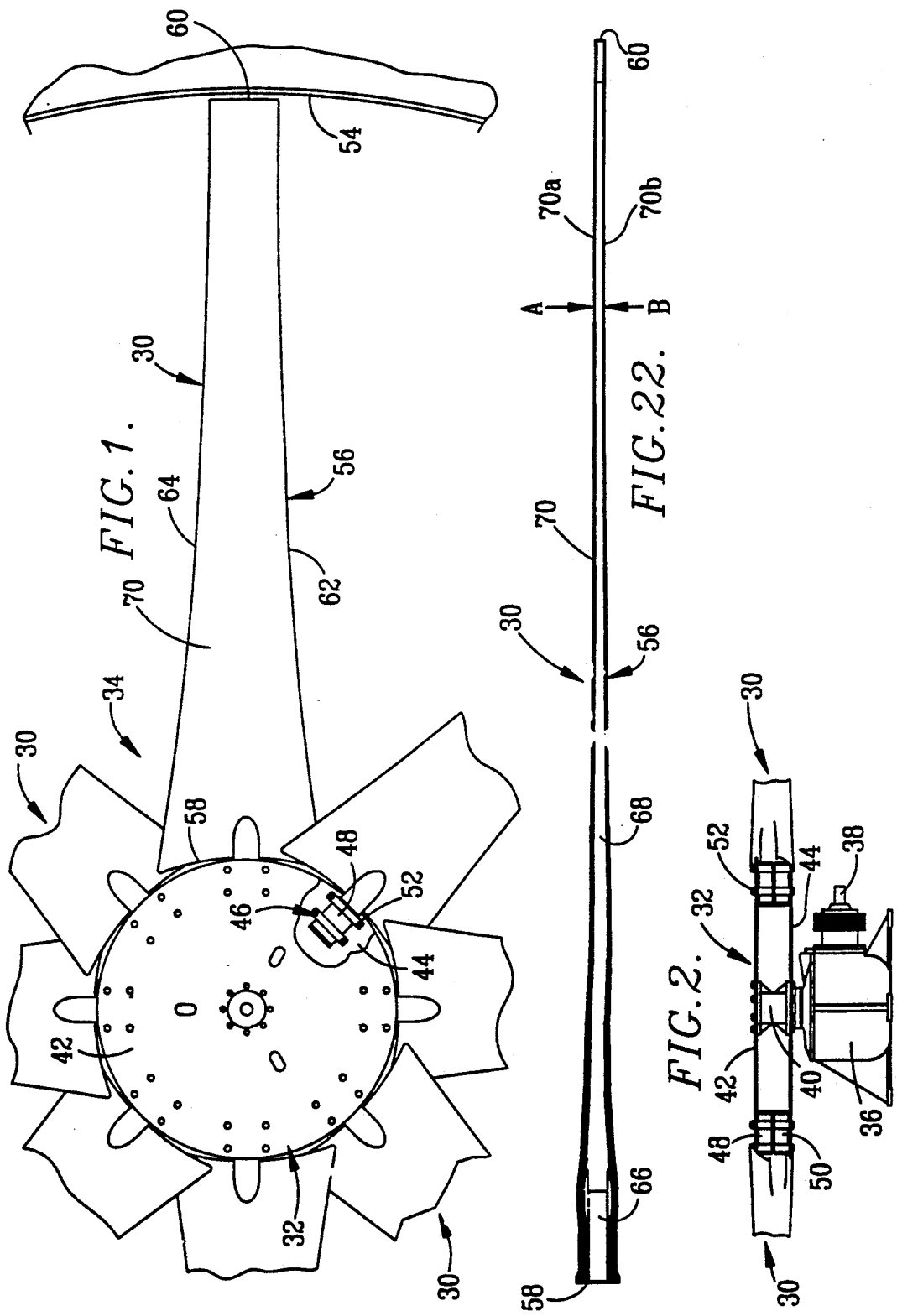

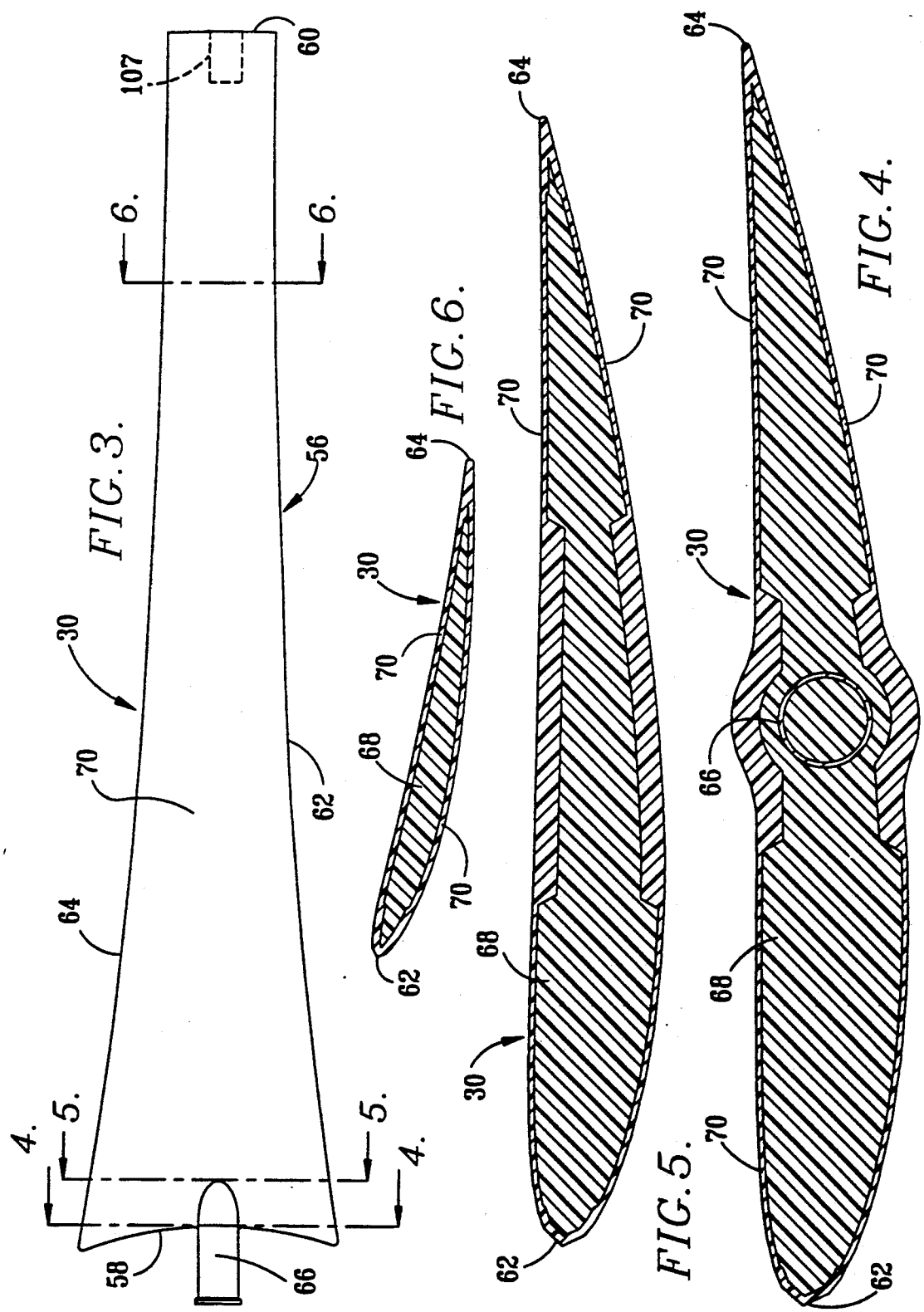

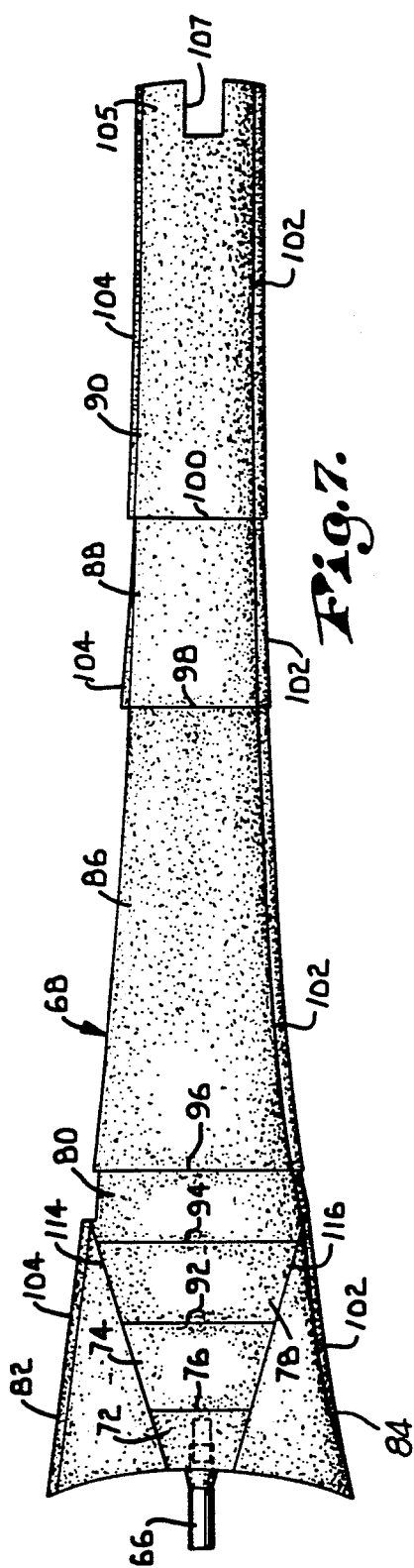
Fig. 7.
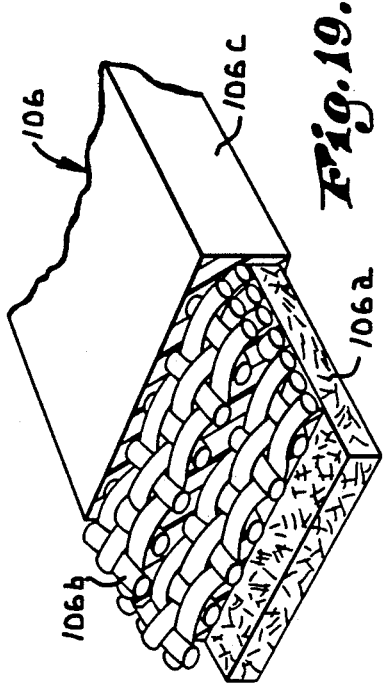
Fig. 19.
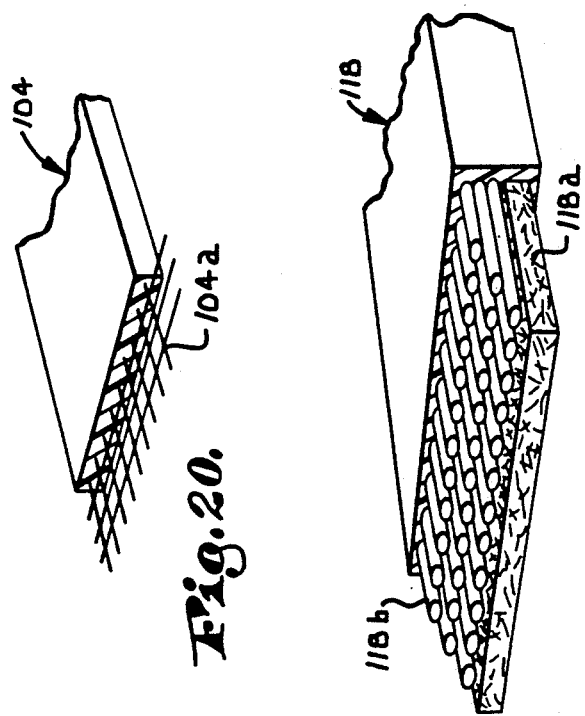
Fig. 18.
Fig. 20.

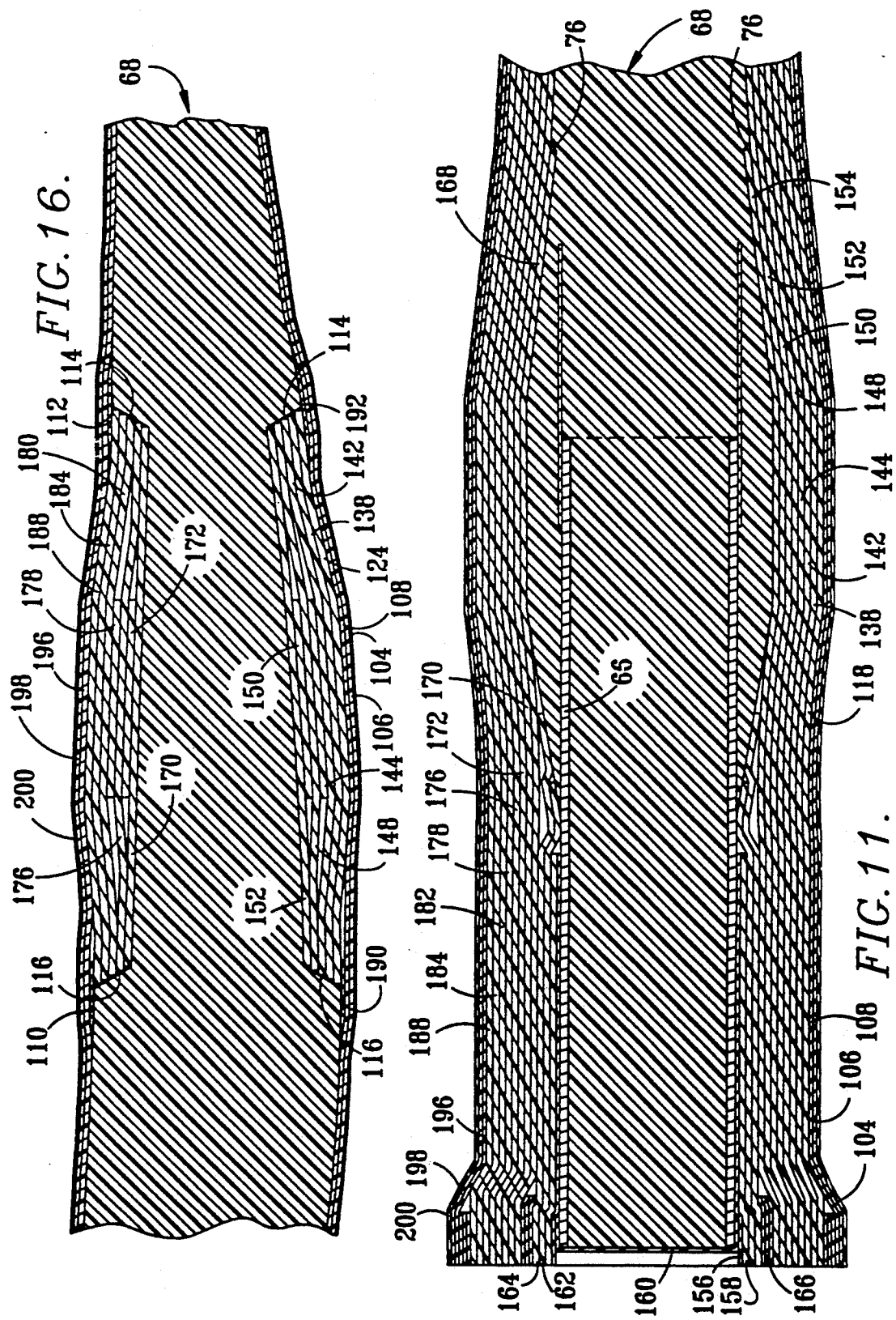

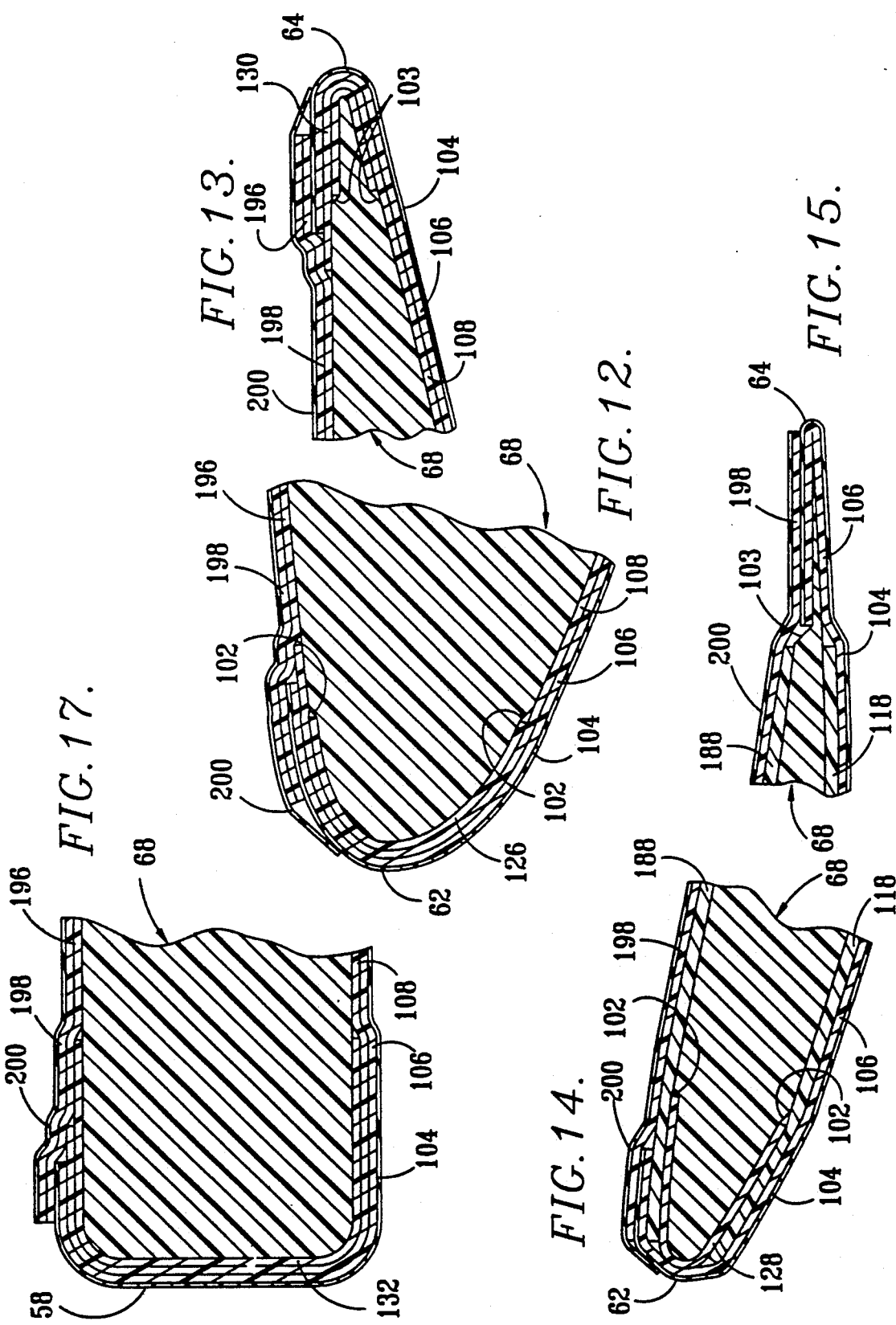

PLASTIC FAN BLADE FOR INDUSTRIAL COOLING TOWERS AND METHOD OF MAKING SAME

BACKGROUND OF THE INVENTION

1. Field of the Invention

This invention relates to cooling towers and particularly to a molded, composite airfoil-defining, synthetic resin blade for large diameter cooling tower fans.

2. Description of the Prior Art

Industrial size induced draft water cooling towers have one or more relatively large diameter fans which pull in air from the surrounding atmosphere and direct such air through the water to be cooled by evaporative effect, before discharge of the hot air through a velocity recovery stack. Fans for these applications generally are of a diameter within the range of from about 12 feet to as much as 60 feet or more.

Small diameter cooling fans within the range of from 2 feet to 12 feet in diameter have for the most part been made of metal such as aluminum. Large diameter industrial cooling tower fans having diameters of from 12 feet to as much as 60 feet on the other hand have often been manufactured from fiberglass reinforced synthetic resin in order to reduce the overall weight of the blade and hub assembly. In small diameters, cooling fan blades of aluminum are less expensive than plastic blades. However, for industrial size fan blades, design constraints often preclude the use of aluminum or other metals. Plastics, usually reinforced with materials such as fiberglass, are the construction materials of choice. Aluminum blades for example become too heavy where the blades are to be used in fans having a diameter of 20 feet or more.

Tip speeds of cooling tower blade fans are relatively high and can be anywhere from 10,000 feet per minute to about 15,000 feet per minute. As a consequence, a synthetic resin cooling tower blade must be capable of withstanding tip speeds of this magnitude over extended usage periods without degradation of the blade surface or its internal components. This is a particularly difficult problem to overcome because of the extremely humid conditions encountered in cooling tower fan operation. Abrasion of the surface of the blade can also occur because of foreign materials in the air stream created by the fan.

Plastic fan blades made up of synthetic resin material reinforced with glass fibers have for the most part been manufactured of an epoxy resin containing fiberglass reinforcement. However, the cost of the resin and the limitations on the use of thermoset type resins such as epoxies, have made epoxy blades very expensive to manufacture and difficult to sell with a reasonable return on the investment.

Polyester fan blades, on the other hand, are less expensive because of the lower price resin, but it has not been heretofore feasible to fabricate polyester having physical and chemical properties commensurate with those of epoxies.

Difficulties have also been encountered in providing an effective means for securing a plastic blade to the steel hub of the fan gear box. The blade shank adapted to be attached to the fan hub must not only be rigidly affixable to various types of hubs, but most importantly, there must not be any tendency for the shank to move relative to the blade which would result in relatively rapid deterioration of that end of the blade and render the latter inefficient at best, and totally ineffective at worst by virtue of dislodgement of the shank from the blade itself.

Manufacture of large diameter plastic fans presents a formidable challenge though because of the tendency of the blade tips to oscillate in use under certain ambient wind conditions and at a particular rpm value, which can damage the blade if tip excursion becomes great enough, and also interferes with efficient blade function.

A need thus exists for a reasonably priced plastic blade for large diameter industrial water cooling tower fan applications where a good surface finish can be provided, the blade has necessary strength characteristics, the required compound curves can be formed, adequate strength to weight ratios can be obtained, and required longevity can be assured. Heretofore, these requisites have not been obtainable at a competitive price.

Composite aircraft propellers manufactured of synthetic resin reinforced with glass fiber material and formed over foam cores have been available for a number of years but the problems presented in the manufacture of aircraft blades are significantly different from those encountered in the design and fabrication of significantly longer blades used in industrial cooling towers. Examples of composite aircraft blades are illustrated and described in Hartzell Propeller, Inc., U.S. Pat. Nos. 4,302,155 and 4,810,167. Aircraft propellers though sell for a significantly higher cost on a linear basis than can be charged for industrial water cooling tower fans and thus it is not commercially practical to employ the technology that has been developed and is in use for manufacture of water cooling tower fan blades.

SUMMARY OF THE INVENTION

This invention solves many of the heretofore unresolved problems encountered during manufacture of relatively long synthetic resin blades for large diameter industrial water cooling tower fans. In particular, the present method of manufacturing a glass fiber reinforced plastic blade permits fabrication of a very long blade structure which is sufficiently stiff such that there is no tendency for the blade to vibrate at its natural frequency when operated at all of its normal rotational speeds and while at the same time being well below its first natural frequency at maximum rotational speed.

Blade cost is significantly reduced as compared with epoxy based blades by virtue of the fact that lower cost polyester synthetic resin compositions may be used for the fabrication of the product. In like manner, the major part of each blade comprises a preformed, stepped foam core which may be made at a relatively low cost.

The compound curve requirements are met by placing the foam core having dimensions approximating those of the final blade configuration in a mold which forms the core into the requisite twisted configuration. Strength to weight specifications are satisfied by utilization of a lightweight foam core which is then covered with a relatively tough, abrasion-resistant, smooth skin which enhances efficiency of the blade. The skin for the foam core comprises a series of separately applied sheets of pre-prepared, flexible glass fiber reinforced polyester resin. The foam core and laminar synthetic resin skin thereover are placed in a suitable mold which forms the blade into predetermined twisted configuration and at the same time facilitates final curing of the resin skin while compressed between the core and the mold surfaces to thereby present a smooth surfaced monolithic skin covering the surface of the core.

This invention also provides a unique method for attaching the shank to the blade body in a manner which ensures integrity of the coupling of the shank to the blade under varying operating loads while at the same time allowing connection of the shank and thereby the blade to a number of different fan hub arrangements.

In particular, the composite blade and its method of construction allows fabrication of a synthetic resin fan blade which may flex adequately during use without permanent deformation, fracture or cracking, has a high strength to weight ratio, and may be manufactured at a more reasonable cost than previously available plastic blades. The use of a preformed foam core which forms a majority of the blade permits utilization of a relatively low weight material. However, the density of the foam is closely controlled so as to not detrimentally decrease the overall beam strength of the blade.

In order to increase the structural integrity of the blade notwithstanding use of a foam core, the core has a series of stepped areas at the most critical points or areas longitudinally of the blade. This allows application of additional layers of glass fiber reinforced polyester material to be applied to the core at the areas where greatest strength is needed. However, by virtue of the fact that the areas where the thickest glass reinforced polyester skin is required is accommodated by relief of the foam core at those points, the outer surface of the blade retains its required smooth configuration throughout the overall extent of the blade.

Another feature is the provision of a glass fiber reinforced polyester sheet lay-up procedure which assures adequate bonding of a metallic shank to the foam core so that there is an equalized distribution of forces to the thicker areas of the skin over the foam core to prevent localized stresses being formed which would crack, deform or tear the skin or the foam core itself.

The outer skin over the foam core has improved strength properties without being so thick as to overburden the blade from a weight standpoint because the skin is made up of a plurality of individually applied pre-prepared sheets of flexible polyester resin reinforced with glass fibers that extend longitudinally of the blade in the case of one layer, and extend both longitudinally and transversely of the blade in another layer.

A smooth outer surface finish of the blade, on the other hand, is accomplished by provision of an outer polyester veil reinforced with relatively thin glass fiber material. If desired, metallic support strips may be provided along the margins of certain of the stepped areas to assure that the outer blade surface is smooth and does not have depressions or groove-defining valleys therein which would impair the smoothness or load carrying capacity of the outer blade face.

The structural integrity and longevity of the monolithic laminated polyester skin has been found to be greater than expected and is believed to be attributable to the fact that the pre-prepared sheets initially applied to the foam core before placement of the composite blade in a suitable mold, are cured under temperature and pressure conditions in the mold between the foam core and the mold surfaces which cause the synthetic resin layers to merge and coalesce into a monolithic laminated skin without voids, surface imperfections or areas of starved resin, and with the skin being intimately bonded to the foam core.

BRIEF DESCRIPTION OF THE DRAWINGS

FIG. 1 is a fragmentary plan view of an industrial water cooling tower fan illustrating the hub which supports a plurality of the plastic blades of this invention;

FIG. 2 is a fragmentary side elevational view on a reduced scale of the hub and blade assembly shown in FIG. 1 and further illustrating a conventional gear box for rotating the fan assembly;

FIG. 3 is a plan view of a blade made in accordance with the preferred concepts of the invention;

FIGS. 4, 5 and 6 are enlarged cross-sectional views taken generally along the lines 4—4, 5—5 and 6—6 respectively of FIG. 3;

FIG. 7 is a plan view of the internal foam core of the blade illustrated in FIG. 3 and on the same scale as the latter;

FIG. 11 is a fragmentary vertical cross-sectional view on an enlarged scale of the shank end of the blade as depicted in FIG. 3, but illustrating the blade assembly prior to insertion in the mold for curing thereof;

FIG. 12 is an enlarged fragmentary vertical cross-sectional view of the leading edge of the blade as depicted in FIG. 5, but before curing;

FIG. 13 is an enlarged fragmentary vertical cross-sectional view of the trailing edge of the blade as depicted in FIG. 5, also before curing of the blade;

FIG. 14 is an enlarged fragmentary vertical cross-sectional view of the leading edge of the blade as depicted in FIG. 6, illustrating the blade assembly before curing;

FIG. 15 is an enlarged fragmentary vertical cross-sectional view of the trailing edge of the blade as depicted in FIG. 6, before curing of the resin layers;

FIG. 16 is an enlarged fragmentary vertical cross-sectional view of the central part of the blade as depicted in FIG. 5, prior to curing of the resin layers;

FIG. 17 is an enlarged fragmentary vertical cross-sectional view through the shank end of the blade as depicted in FIG. 3 and taken along a line to one side of the shank, before curing of the glass fiber reinforced synthetic resin sheets;

FIG. 18 is a fragmentary, enlarged, generally schematic representation of a synthetic resin layer reinforced with essentially unidirectional glass fibers and which is applied to the core during fabrication of the blade;

FIG. 19 is a fragmentary, enlarged, generally schematic representation of a synthetic resin layer reinforced with essentially bi-directional glass fibers and which is applied to the core during fabrication of the blade;

FIG. 20 is a fragmentary, enlarged, generally schematic representation of the synthetic resin veil reinforced with glass fiber material, and which makes up the outer surface of the blade;

FIG. 22 is a vertical longitudinal cross-sectional view in schematic form of the blade as depicted in FIG. 3.

DETAILED DESCRIPTION OF THE PREFERRED EMBODIMENT

Figure 21:
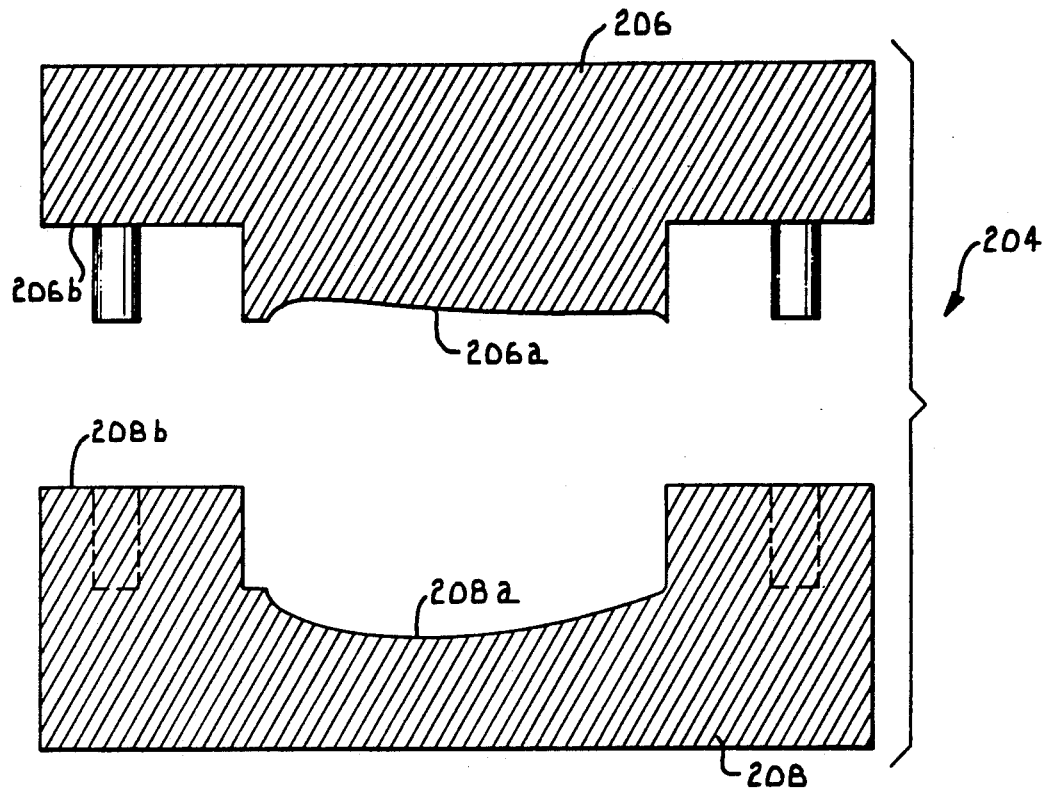
FIG. 21 is a schematic vertical cross-sectional representation of a mold for forming the blade into the final desired configuration, and for exerting pressure on the blade as the skin thereof undergoes cure at an elevated temperature.

The plastic fan blade 30 made in accordance with the preferred concepts of the present invention is adapted to be mounted on the hub assembly 32 forming a part of the fan 34 of an industrial type water cooling tower.

Fan 34 is conventionally driven through a gear box 36 (FIG. 2) having an input shaft 38 rotated by a remotely mounted motor (not shown). Cross members, also not depicted in FIG. 2, support gear box 36 as well as the drive motor therefor. The output shaft of gear box 36 is received within the central hub 40 of assembly 32.

Hub assembly 32, in the embodiment illustrated in the drawings, has a pair of vertically spaced circular plates 42 and 44 which are bolted to the central hub 40. A series of clamp units 46 are located between plates 42 and 44 in radially extending disposition, circumferentially spaced and disposed at the peripheral margins of the plates. Clamp units 46 have separable, generally U-shaped clamp members 48 and 50 which are joined by suitable connectors in the form of bolts 52.

As shown in FIG. 1, hub assembly 32 is provided with eight clamp units 46 for mounting of eight separate fan blades 30 in radially extending relationship from the assembly 32. However, it is to be understood that the number of blades is variable depending upon the specifications established for fan 34, including horsepower available, air flow requirements, diameter of the fan, and the nature of the velocity recovery stack 54 in which the fan is caused to rotate.

Viewing FIG. 3, it is to be seen that each of the blades 30 comprises an elongated body 56 which is longitudinally tapered along its length with the shank end 58 being substantially wider than the tip end 60. The taper of the blade is such that the thickness thereof decreases in a direction from the shank end towards the tip end, as best illustrated in FIG. 22. The leading edge 62 as well as the trailing edge 64 of blade 30 are somewhat arcuate in plan view along the length longitudinally of the blade. Furthermore, the blade is desirably transversely arcuate so that the upper surface is somewhat concaved while the bottom face is convex as illustrated in FIGS. 4-6.

Blade 30 is of essentially plastic construction with only the tubular shank 66 being of metallic construction. The shank 66 may, for example, be of 10 gauge tubular carbon steel and of dimensions to fit within and be tightly clamped by the clamp members 48 and 50 of respective clamp units 46. A typical metal shank insert in this respect may, for example, be 2.5 inches O.D. and about 10 inches in length.

Each blade 30 includes as major components, a central foam core 68, the cylindrical metallic shank insert 66 extending from the shank end 58 of blade 30, and an outer monolithic laminar skin broadly designated 70.

In the manufacture of each blade 30, the synthetic resin foam core 68 is formed in a suitable mold therefor to define the shape as shown in FIG. 7. A polyurethane foam cured with an isocyanate catalyst is preferred having a density of from about 2½ to 4 pounds per cubic foot with best results being obtained when the foam has a density of about 3½ pounds per cubic foot. Polyurethane foams allowed to expand without restraint result in a product having a final density of only about ½ pound per cubic foot. However, by forming the foam core in a closed mold under pressure, the density of the core can be closely controlled, and a core produced having a virtually void-free outer face. The molded core is preferably subjected to a post-cure cycle at a temperature of about 100° F. upon removal of the core from the mold for a time period sufficient to effectively drive off excess isocyanate which could be released and cause voids in the outer skin 70 during final formation of the blade 30.

In addition, as is evident from FIG. 7, steel shank 66 is inserted in the foam core mold in disposition such that the cylindrical shank 66 is partially embedded in the shank end of core 68 and projects outwardly therefrom so that the blade 30 formed from core 68 may be firmly affixed to hub assembly 32.

Figure 8:
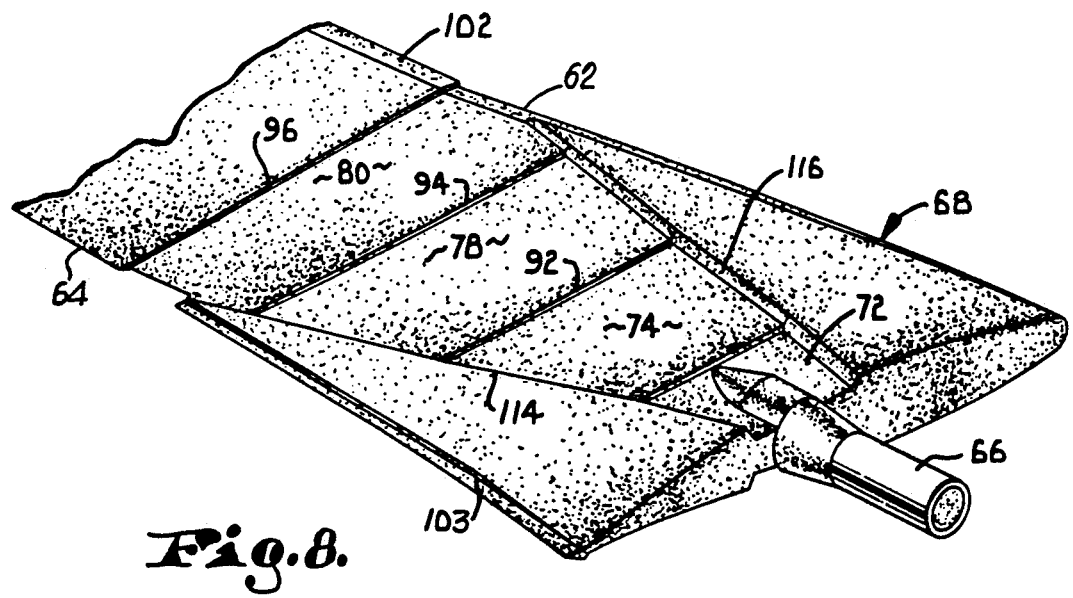
FIG. 8 is an enlarged fragmentary perspective view of the shank end of the foam core as illustrated in FIG. 7.

The mold for forming foam core 68 has a series of raised portions extending from the surfaces thereof which produce stepped areas in the core as best shown in FIG. 7. The trapezoidal relieved areas 72 of core 68 on opposite faces thereof in direct alignment with the innermost end of shank 66 present a first transition area in the surfaces of the foam core 68. The trapezoidal areas 74 next adjacent to and at a higher elevation than respective areas 72 are separated by steps 76. In like manner, the trapezoidal areas 78 proximal to corresponding areas 74 are stepped up from and at a higher elevation than areas 74. Generally rectangular areas 80 (FIGS. 7 and 8) somewhat elevated above adjacent areas 78 extend the full width of the foam core 68. It is now to be perceived from FIG. 7 that the side edges of areas 72, 74 and 78 on the bottom and top of core 68 are at an angle such that the edges diverge in a direction away from shank 66. Thus, the areas 72, 74, 78 and 80 which successively step up a direction away from shank 66, are bounded by opposed triangular wing areas 82 and 84 at the shank end of core 68 on both the top and bottom of the core.

Outboard transition areas 86, 88 and 90 again successively step up from areas 72, 74, 78 and 80 as the tip end of the core is approached. As a consequence, transversely extending steps 92 join areas 74 and 78 on each side of the core, steps 94 join areas 78 and 80, steps 96 join areas 80 and 86, steps 98 join areas 86 and 88 on each side of the core, and steps 100 join respective areas 88 and 90. The leading and trailing edges of core 68 are also relieved at zones 102 and 104 along the longitudinal length of the core.

The outermost tip end 105 of core 68 has a slot 107 therein which is designed to accommodate bagged lead shot, or other similar relatively heavy granular material added to the blade 30 in its final stages of fabrication in order to permit balancing of the blade, particularly after assembly of a series of the blades on hub 34 and operation of the multi-blade fan at its normal rotational speed.

In most instances it is desirable that the blade 30 be of longitudinally twisted, airfoil-defining configuration. Therefore, although core 68 can be formed in a mold so that the core is in the final desired longitudinally twisted shape of blade 30, equally effective results may be obtained by molding the core in relatively flat condition with reliance being placed on the final mold to form the blade into its twisted configuration, by virtue of the fact that the degree of twist nominally is no more than about 12° from one end of the blade to the other.

After removal of the molded foam core with steel shank 66 embedded therein from the core mold, the foam core 68 is then shifted to a suitable table which desirably has a shaped upper surface complemental with that of the core if it is longitudinally twisted to provide better support for the latter.

Figure 9:
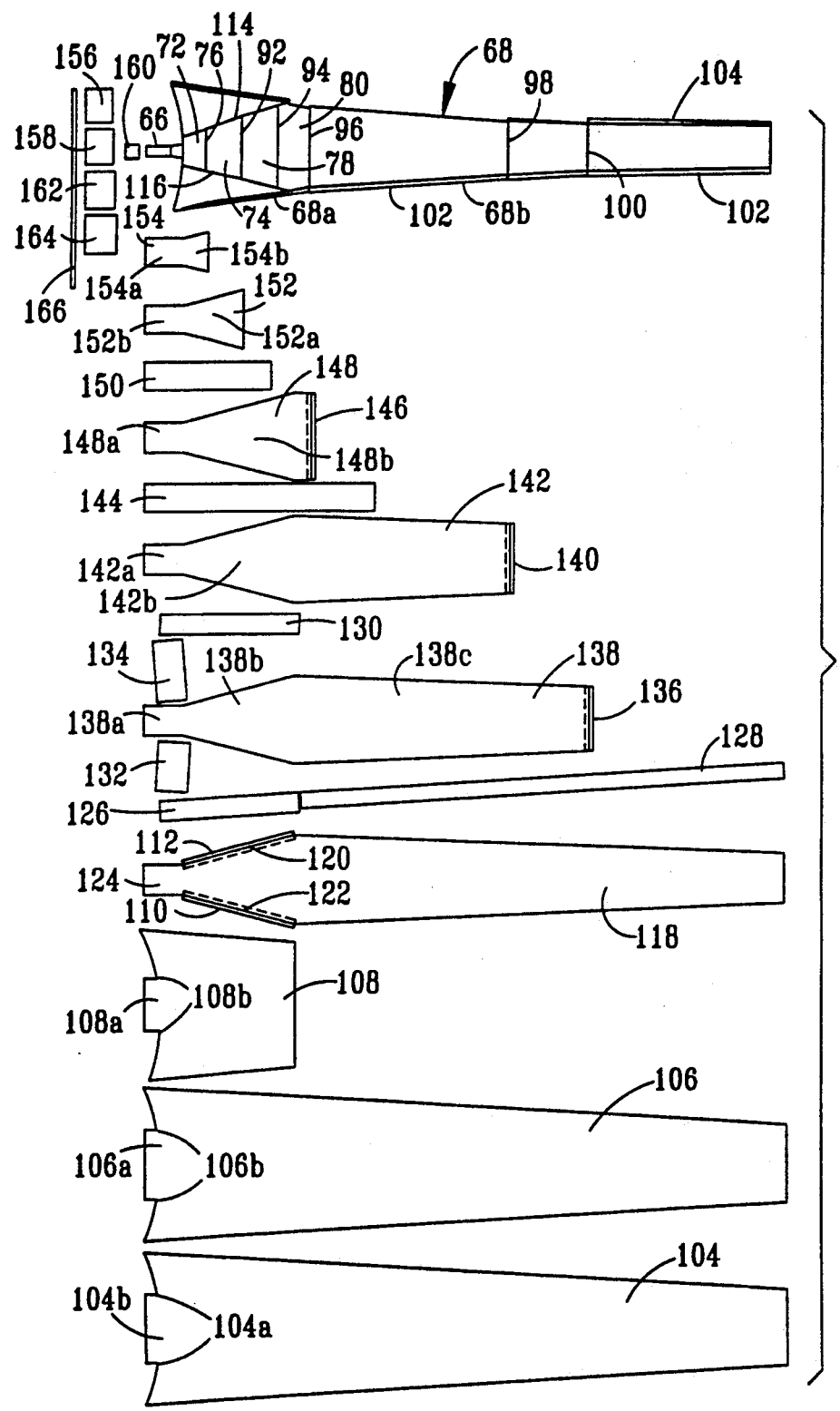
FIG. 9 is a schematic representation of the bottom of the foam core as shown in FIG. 7 and illustrating in sequential order the various synthetic resin sheets which are applied to the bottom of the core during fabrication of the blade.

FIG. 9 illustrates in schematic form the manner in which individual sheets of synthetic resin material are applied to the bottom surface of foam core 68. This is accomplished by first laying out on the table a flexible sheet of synthetic resin material which preferably makes up the veil 104 of the bottom surface of the blade 30. As can be seen from FIG. 9, the sheet of flexible glass fiber reinforced synthetic resin material comprising veil sheet 104 is of generally the same configuration as core 68 but is somewhat greater length and width than the core so that the outer marginal portions of the veil may ultimately be wrapped around the leading and trailing edges of the blade and also around the end margins thereof.

The veil 104 is preferably a chemically thickened polyester sheet as illustrated schematically in FIG. 20 and includes a resin composition containing on a weight basis about 66.27% isophthalic polyester resin (e.g., Aristech 14017 resin), and about 0.66% tertiary-butyl perbenzoate as a curing agent. In addition, the composition includes about 1.99% of zinc stearate, about 3.31% of ASP-400-P, about 0.2% CM-2006 and about 1.99% of MgO (e.g., Aristech Modifier M, 33% active) which serve to adequately thicken the base resin. Reinforcement for the veil, again on a weight basis, may take the form of about 4.24% of a 10 mil glass cross-fiber surface mat denoted by the numeral 104a in FIG. 20, and 21.34% of chopped, randomly oriented glass fibers, each about 1 inch in length. The randomly oriented glass fibers are located inboard of the fiberglass surface mat in the final composite blade assembly.

Next, and continuing with the schematic representation of FIG. 9, a pre-prepared flexible synthetic resin sheet 106 is laid on the table in overlying complemental relationship to veil 104. The skin layer 106 as shown schematically in FIG. 19 is of essentially the same configuration and dimensions as veil sheet 104. The skin layer 106 is made up on a weight basis of a resin composition preferably comprising about 32.634% of the isophthalic polyester used for fabrication of veil 104, and about 0.326% of tertiary-butyl perbenzoate to effect curing of the polyester. Again, additives may be incorporated in the resin formulation including about 0.82% of carbon black pigment, 0.979% of zinc stearate and 0.979% of MgO as resin thickening agents. The reinforcement component of the skin layer 106 may comprise on a weight basis of about 64.0% of biaxial woven roving and about 1.0% of chopped fiberglass roving made up of generally 1 inch individual fibers. The relative orientation of the chopped roving 106a with respect to the woven roving 106b embedded in the resin 106c is illustrated in FIG. 19. In orienting sheet 106 on the support table, the chopped roving layer 106a should face upwardly and thereby inboard of the outer surface of the final blade.

The chemically thickened isophthalic polyester resin sheet material reinforced with woven glass fibers and chopped roving as illustrated schematically in FIG. 19, is referred to herein as being material "W".

By virtue of the dimensions of the skin layer sheet 106 with respect to the overall shape of core 68, the outer margins of the layer 106 also are adapted to be wrapped around the leading and trailing edges of the core 68 as well as the end extremities thereof.

A fiberglass reinforced, pre-prepared, flexible synthetic resin shank layer sheet 108 is placed over sheet 106 with it being noted from FIG. 9 that the leftmost margin of the shank sheet is generally of the same shape as that of the left end of sheet 106 except that the tab portion 108a thereof is not as large as the tab portion 106a of sheet 106. The shank sheet 108 is made up of the same composition as that of sheet 106, and is placed over sheet 106 so that it substantially aligns with the left end of the latter.

Elongated thin metal support strips 110 and 112 are then placed over sheet 108 in disposition such that they align with the angular opposed end extremities of stepped areas 72, 74 and 78, which are defined by the stepped area lines 114 and 116 of core 68 which converge as the shank end of the blade is approached. The exact orientation of support strips 110 and 112 may be best ascertained after the next pre-prepared, flexible glass fiber reinforced synthetic resin internal layer sheet 118 is placed on the layered assembly. As is evident from FIG. 9, the sheet 118 is of generally the same configuration as core 68 except that it has angular shank end margins 120 and 122 which are configured to be complemental with the stepped area lines 114 and 116 on a respective face of core 68. Furthermore, sheet 118 has a generally rectangular extension 124 which is adapted to be wrapped around the metallic shank 66. Thus, upon placement of sheet 118 over sheet 108 and the underlying sheet 106, and upon alignment of the ends of sheet 118 with the extremities of sheets 104 and 106, the metal support strips 110 and 112 may be positioned so that they only partially underlie margins 120 and 122 of sheet 118.

Sheet 118 is schematically illustrated in cross-section in FIG. 18 and includes on a weight basis about 32.634% of the isophthalic polyester resin previously described and approximately 0.326% of tertiary-butyl perbenzoate curing agent. Additives include about 0.82% carbon black pigment, 0.979% zinc stearate and 0.979% MgO thickeners. The reinforcement part of the sheet is made up of about 64.0% of stitched unidirectional glass fibers and about 1.0% of chopped randomly oriented glass fiber roving having 1 inch fibers. The relative orientation of the reinforcement of sheet 118 is depicted in FIG. 18 wherein it can be seen that the randomly oriented layer 118a underlies the unidirectional glass fiber mat 118b. In placement of the sheet 118 on the layered assembly, the chopped roving 118a is facing upwardly and thereby oriented inboard of the unidirectional mat 118b with respect to the internal core 68 of the blade.

The chemically thickened isophthalic polyester resin sheet material reinforced with unidirectional glass fibers and chopped roving as illustrated schematically in FIG. 18, is referred to herein as being material "U".

Flexible synthetic resin, woven glass fiber reinforced, margin protective skin defining sheets 126, 128 and 130 are next placed on the support table with each being of composition "W". The relatively short rectangular sheet 126 is oriented so that it ultimately may be wrapped around the marginal shank end section 68a of core 68 while the much longer rectangular sheet 128 is positioned so that it is end to end with sheet 126 but is adapted to be wrapped around the leading edge portion 68b of core 68. Sheet 130 is opposed to sheet 126 and is located so that it may be wrapped around the shank end trailing edge of core 68.

The shank wrap sheets 132 and 134 are next placed on the support table and comprise relatively small rectangular members of composition "W". The sheets 132 and 134 are designed to be wrapped around the inboard end of the wing areas and constitute the initial wrap on the shank end of the foam core 68 as shown in FIG. 17.

Another thin metallic support strip 136 is placed on the table or support in disposition such that it will ultimately overlie the step 100 on a respective side of the core 68.

Next, a pre-prepared, flexible synthetic resin, unidirectional glass fiber reinforced inner layer sheet 138 of composition "U" is positioned on the layered assembly so that the leftmost end thereof is aligned with the left ends of the preceding sheets. It is to be seen from FIG. 9, that the sheet 138 has a left extension 138a which generally conforms to extension 124, a central trapezoidal section 138b generally similar in shape to the central trapezoidal left end of sheet 118 and with the similar trapezoidal part of core 68 defined by lines 114 and 116, and a larger trapezoidal section 138c which generally conforms to the trapezoidal part of core 68 between steps 96 and 100. As is evident from FIG. 9, support strip 136 is disposed such that it is in partially underlying relationship to the right end margin of section 138c of sheet 138. In that disposition, the support strip 136 will align with and underlie the adjacent step 100 of core 68.

Another thin metal support strip 140 is then placed over the assembled sheets in disposition such that it will be in alignment with the core step 98 of the complete blade 30. A pre-prepared, flexible synthetic resin sheet 142 reinforced with unidirectional glass fibers and of composition "U" is placed on the support in overlying relationship to sheet 138. The sheet 142 is of generally the same shape as sheet 138 but somewhat shorter so that the right-hand extremity thereof will align with step 98 of core 68. Support strip 140 partially underlies the right margin of sheet 142 so that it will be between sheets 138 and 42 in alignment with a step 98 of core 68.

Sheet 142 is followed by a relatively narrow rectangular pre-prepared, flexible, unidirectional glass fiber reinforced synthetic resin sheet 144 and constructed of composition "U". Sheet 144 is located centrally of the underlying sheet 142 equidistantly from the side margins thereof. A thin metallic support strip 146 is placed on the layered assembly in disposition such that it will align with a step 96 of core 68 and is of essentially the same length as the respective step.

Pre-prepared, flexible synthetic resin sheet 148 placed over the rectangular strip sheet 134 is of composition "U" and thereby has unidirectional glass fiber reinforcement. The rectangular extension 148a of sheet 148 aligns with extension 142a of sheet 142 while the trapezoidal section 148b of the sheet 148 also is of configuration to be complementally aligned with the trapezoidal section 142b of sheet 142.

A rectangular pre-prepared, flexible unidirectional glass fiber reinforced stiffening sheet 150 of composition "U" and having the same width as sheet 144 but of shorter length is then placed over sheet 148 with the left margins of each in alignment.

A generally trapezoidally shaped sheet 152 of composition "U" is placed over rectangular sheet 150 so that it also aligns with the left margin of the stacked layers. Sheet 152 has a trapezoidal section 152a which conforms to the trapezoidal shape of areas 72 and 74 of the core 68. The rectangular extension 152b of sheet 152 is of the same shape as the extension 148a of sheet 148.

A final trapezoidal sheet 154 of composition "U" is placed over sheet 152, again with its leftmost margin in alignment with the left margin of sheet 152 and the underlying sheets. The rectangular extension 154a of sheet 154 conforms generally to the rectangular sections of the underlying sheets, as for example, sheet 152, while the trapezoidal section 154b generally is of a shape conforming to the trapezoidal area 72 of core 68.

The core 68 is now ready to be placed over the supported "sandwich" made up of sheets 104, 106, 108, 118, 138, 142, 144, 148, 150, 152, and 154.

Before placement of the core 68 on the "bottom" sheet layers, the shank insert is wrapped with glass fiber reinforced pre-prepared, flexible, synthetic resin sheets using the sheet components illustrated in the upper left-hand corner of FIG. 9. The synthetic resin end sheet 160 of woven glass fiber reinforcement of composition "W" is initially placed over the end of shank 66 with the extremities thereof drawn down over the sides of the shank. A small rectangular sheet 156 of composition "W" is then wrapped around shank 66. Next, small rectangular sheet 158 of composition "U" is wrapped around the shank 66 with this sheet having unidirectional glass fiber reinforcement. Finally, a pair of pre-prepared, flexible synthetic resin sheets 162 and 164 reinforced with unidirectional glass fibers and of composition "U", are successively placed over the sheet 158 and drawn down tightly against the layers placed over the shank 66. A elongated strip 166 is next wound around the shank 66 adjacent core 68. Strip 166 is also of synthetic resin reinforced with woven glass fiber and of composition "W".

It is to be noted in this respect that the sheets 154, 152, 148, 142 and 138 all have right margins which generally align with corresponding stepped areas of the core 68. The height of each stepped area of core 68 with respect to an adjacent area is preferably slightly less than the effective thickness of the sheet which immediately overlies that part of the core 68.

Figure 10:
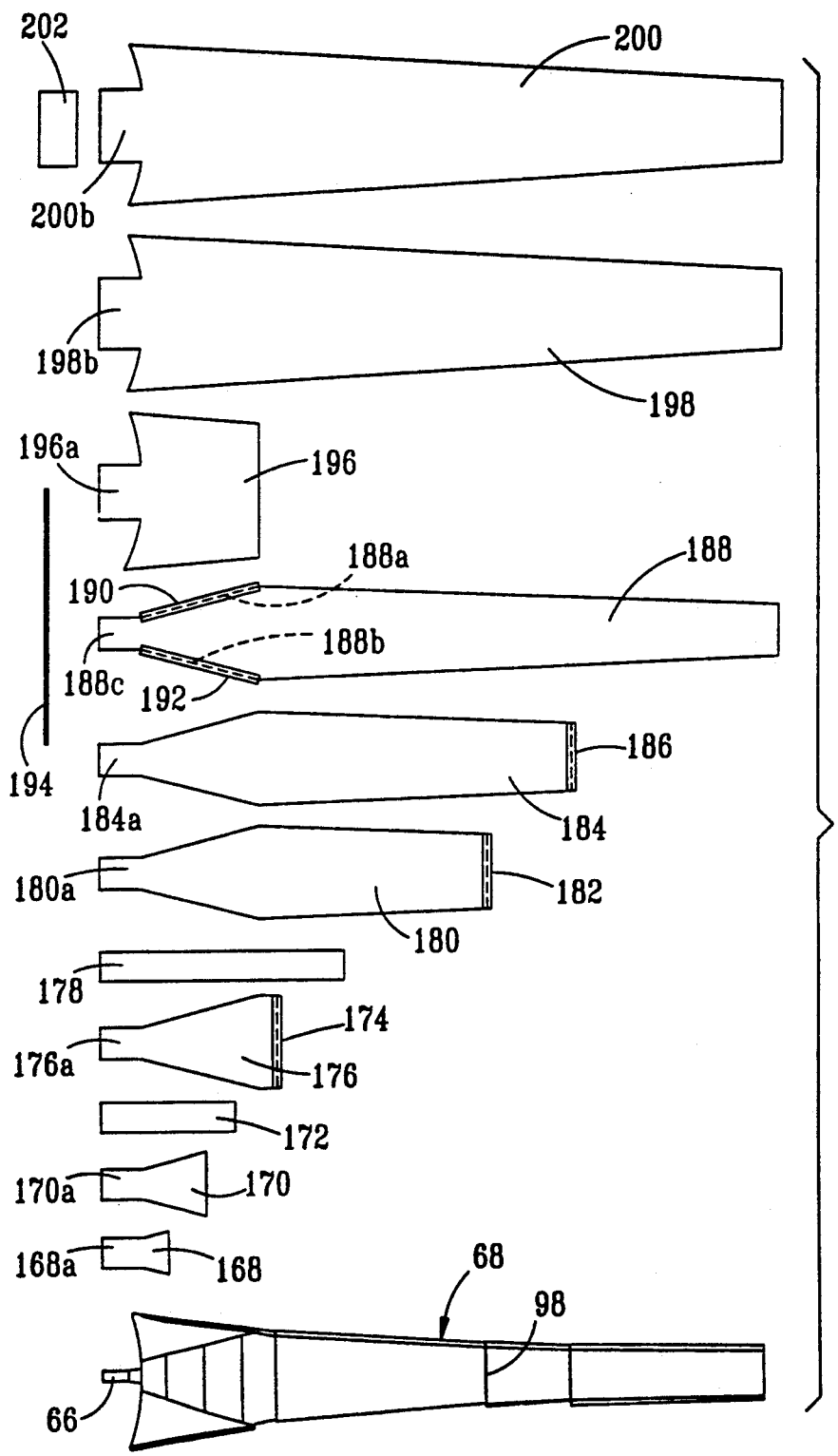
FIG. 10 is a schematic representation similar to FIG. 9 but illustrating the top of the foam core and showing in sequential order the synthetic resin sheets which are applied to the top of the core during fabrication of the blade.

The next operation in the pre-preparation of blade 30 involves placement of sheets over the core 68 while still supported on the table or other support with the individual sheets and their placement sequence being indicated schematically in FIG. 10. A sheet 168 of composition "U" similar to sheet 154 is placed over the core 68 so that its leftmost edge aligns with the outer end of shank 66 and the right edge aligns with step 76. The generally rectangular extension 168a of sheet 168 is wrapped around the composite shank made up of sheets 156–164 and strip 166, in association with wrapping of extension 154a thereround.

Sheet 170 also of composition "U", and of generally similar configuration to sheet 152 is placed over sheet 168 and the extensions 152b and 170a wrapped around the overlay 154a and 168a of shank 66. Rectangular sheet 172 of the same size as sheet 150 and also cut from composition "U" material is laid over sheet 170 and the leftmost portions of sheets 150 and 172 wrapped around the composite shank buildup.

A thin metal support strip 174 similar to support strip 136 and the associated trapezoidal sheet 176 configured similar to sheet 148 and of composition "U" are placed over the core 68 in location such that support strip 174 overlies sheet 176 and the adjacent core step 96. Furthermore, the extension 176a of sheet 176 aligns with the composite shank. Extensions 148a and 176a of sheets 148 and 176 are then tightly wrapped around the shank being built up at the left end of core 68.

Elongated rectangular sheet 178 having unidirectional glass fiber reinforcement and thereof cut from composition "U" material is of the same dimensions as sheet 144. After sheet 178 is laid over the trapezoidal sheet 176, the leftmost end of the sheet is wrapped around the composite shank along with the left end of rectangular sheet 144.

Generally trapezoidal, unidirectional glass fiber reinforced synthetic resin sheet 180 is next laid over the sheet buildup on core 68. Sheet 180 has generally the same shape and is of the same composition "U" as sheet 142. The extension 180a is wrapped around the composite shank along with the extension 142a of underlying trapezoidal sheet 142 A thin metal support strip 182 is laid over the right endmost margin of sheet 180 in disposition to partially overlie the right margin of sheet 180 and thereby be in alignment with a step 98 on the adjacent face of core 68.

Unidirectional glass fiber reinforced synthetic resin sheet 184 of composition "U" and having a similar shape as sheet 138 is placed over sheet 180, along with a thin metal support strip 186 which partially overlies the right margin of sheet 184 as shown in FIG. 10. The left rectangular extension 184a of sheet 184 is wrapped around the composite shank in association with extension 138a of sheet 138.

Elongated, generally trapezoidally shaped, synthetic resin sheet 188 reinforced with unidirectional glass fibers and thereby formed of material "U" is placed over sheet 184 with the sheet 188 being of similar overall dimensions as sheet 118. As is also apparent from FIG. 10, two elongated relatively thin metallic support strips 190 and 192 are placed over the angularly, converging margins 188a and 188b of sheet 188 in locations such that the support strips will align with the stepped areas 114 and 116 on an adjacent face of core 68. The left generally rectangular extension 188c of sheet 118 is wrapped around the composite shank along with the extension 124 of sheet 118.

A relatively narrow elongated synthetic resin strip 194 reinforced with woven glass fibers and therefore fabricated from material of composition "W", is spirally wound about the composite shank made up of cylindrical member 66 and the glass fiber reinforced sheet portions previously wrapped therearound.

A woven glass fiber reinforced synthetic resin sheet 196 of composition "W" and having the same shape as the inboard end of sheet 198 is placed over sheet 188 and the support strips 190 and 192 thereon, so that the leftwardly extending, generally rectangular extension 196a of the sheet 196 aligns with extension 108a of sheet 108.

The sheets 108, 106 and 104 are cut inwardly along a dog-leg shaped line extending inwardly from the corners 108b, 106b and 104a respectively as shown in FIG. 9 so that the leftmost margins of such sheets may be wrapped around the shank end of core 68. This is accomplished by first folding the flaps of sheet 108 upwardly over the end margin of core 68 followed by folding of the flap portions of sheets 106 and 104 in successive order thereafter. The segments 108a and 106a of sheets 108 and 106 respectively as well as the flap 104b of sheet 104 are folded upwardly into generally conforming relationship to the undersurface of the cylinder defined by shank insert 66 and the sheets 156–166 and extensions 154a, 152b, sheet 150, extensions 148a, sheet 144, and extensions 142a, 138a and 124 that have been placed thereover. The leading and trailing edges and tip area of sheets 106 and 104 which project beyond the perimeter of core 68 are also folded upwardly and around the core perimeter and pressed down flat against the upper surfaces of sheets 196 and 198.

A synthetic resin sheet 198 reinforced with a woven glass fiber mat and therefore fabricated of composition "W" material, is placed over wrapped edges of sheets 108, 106 and 104 as well as the sheets 196 and 188 acting as a binding sheet to hold the pack together while transferring to the mold. The sheet 198 has essentially the same shape as blade plan form. The rectangular left end extension 198b of sheet 198 is folded around the composite shank along with the extension 106a of sheet 106.

An outer veil sheet 200 of synthetic resin material containing 10 mil glass cross-fiber material and of the composition described with respect to FIG. 20, and configured to conform with the sheet 198, is placed over sheet 198 in alignment therewith. The rectangular extension 200b of sheet 200 is folded around the shank projecting from core 68, in association with the extension 104b of underlying veil sheet 104.

A final small rectangular synthetic resin, woven glass reinforced sheet 202 of composition "W" is wound about the composite shank projecting from the left margin of the core 68.

The blade-defining layup of glass reinforced synthetic resin sheets including an outer veil which overlie the internal molded core 68 is then lifted from the support table and positioned in a mold which is schematically illustrated in FIG. 21 and generally designated by the numeral 204. The mold is made up of a pair of sections 206 and 208 with section 206 being provided with a cavity-defining male section 206a while mold section 208 defines a cavity 208a. The outer margins of the molds 206 and 208 have bearer surfaces 206b and 208b respectively which limit the degree of travel of mold sections relatively.

The pre-prepared, flexible synthetic sheets having unidirectional glass reinforcement and which are identified as being of composition "U" are each about 0.09" thick whereas the sheets of composition "W" are all about 0.06" thick. The steel support strips are about 0.01" in thickness. The thickness of the veil may be varied but nominally is about 0.015" thick.

In a preferred embodiment of the invention, utilizing glass fiber reinforced synthetic resin sheets along with veil-defining sheets 104 and 200, the blade layup is cured in mold 204 at a temperature of 250° F. to 350° F., and most desirably at about 270° F. for from 25 to 60 minutes and preferably about 45 minutes cure time in the mold. The pressure applied to the blade layup in the mold is desirably in the order of about 125 to 225 psi and preferably about 175 psi. The temperature of the resin is raised to a point where sufficient flow takes place to cause the individual, initially discrete layers of synthetic resin sheet material to flow together and form a composite, substantially monolithic laminar skin reinforced with unidirectional, woven, and random fiber glass matting.

A very important aspect of the present invention is the fact that the resin layers making up skin 70 of blade 30 are virtually incompressible during curing, and that property may be relied upon to effect compression of the core 68 during curing by undersizing the mold cavity of mold 204 relative to the dimensions of the blade layout prior to insertion of such blade in the mold. The degree of compression applied to the blade layup should be sufficient to assure complete lamination of the various glass fiber reinforced synthetic resin sheets applied to the core to form a monolithic skin layer which presents a smooth, essentially uninterrupted outer surface. In addition, compensation must be provided for the fact that the overall thickness of the layers of fiberglass reinforced resin layers making up skin 70 varies along the length of the blade.

It has now been discovered that by dimensioning the blade defining cavity of the mold such that the opposed major airfoil defining surfaces 206a and 208a are spaced apart a distance when the mold is closed which is correlated with the composite thickness of the core and top and bottom skin-defining synthetic resin layers therebetween, the core is compressed to an extent that its thickness is reduced from about 15% to about 40% of the combined thickness of the upper and lower skin layers, and preferably about 25% of such combined thickness. For example, and referring to FIG. 22, the following equations may be employed to determine the relative thickness dimensions of the uncompressed core between points A and B of the upper skin layer 70a and lower skin layer 70b of skin 70.

$$T_U = T_{A-B} - 0.75(t_A + t_B) \quad [I]$$

$$T_C = T_{A-B} - (t_A + t_B) \quad [II]$$

$T_U$ = Uncompressed core thickness
$T_{A-B}$ = Final thickness of blade between points A and B as shown on FIG. 22.
$t_A$ = Skin thickness of upper blade surface at point A
$t_B$ = Skin thickness of lower blade surface at point B
$T_C$ = Final compressed core thickness Thus, if it is assumed that the skin 70 of blade 30 is made up of glass fiber reinforced synthetic resin internal layers and a relatively thin glass cross-fiber mat reinforced synthetic resin outer veil of preferred dimensions as described above, the layers overlying the outermost tip end of blade 30 would be of a thickness approximating 0.165". (0.09" unidirectional glass layer, 0.060" woven glass layer and 0.015" veil layer.) If it is further assumed that the distance between points A and B of blade 30 as shown in FIG. 2 is 1.25", then these values when applied to equations [I] and [II] yields:

$$t_A = t_B = 0.165"$$

$$T_{A-B} = 1.25"$$

$$T_U = 1.25 - 0.75(0.165 + 0.165) = 1.0025$$

$$T_C = 1.25 - (0.165 + 0.165) = 0.9200$$

The same equations [I and II] may be utilized to establish the core thickness at any other point along the length thereof.

The thickness of the synthetic resin skin overlying core 68 is varied so that there is greater thickness at the hub end of the blade 30 than at the outer tip end. This variable thickness is required to compensate for the need for greater strength adjacent the shank 66, than at the tip end of the blade. However, the differences in thickness of the sheet layup over the longitudinal and transverse extent of the core 68 would result in different degrees of compression of the core 68 and thereby cause changes in the transverse thickness of the glass fiber reinforced synthetic resin skin which could cause irregularities in the skin thickness and change the bending resistance properties of the blade as well as its surface finish. The provision of the stepped areas of the core 68 overcomes the problem that would be encountered by utilization of synthetic resin overlay layers of different overall composite thickness, by virtue of the fact that as the layers of synthetic resin material increase in effective thickness, the core is of lesser thickness in direct opposition thereto, to the same extent that the skin layers are thicker. As is evident from the above description, each of the stepped areas of the core is approximately 75% of the thickness of the glass fiber reinforced synthetic resin sheet placed immediately thereover. Thus, the compression of the core 68 is relatively uniform over the entire longitudinal and transverse extent of the blade 30.

This principle is illustrated in Fig 11 for example in that upon curing of the glass fiber reinforced synthetic resin layers, the "hump" evident in FIG. 11 presented by the foam over shank 66 is straightened out during the curing process so that the outer face of the cured blade is substantially co-extensive in height with the layers of sheet material overlying the metal shank 66. Those layers cannot move inwardly by virtue of incompressibility of the steel cylinder as compared with the adjacent portions of the foam material making up a part of core 68.

Curing of the sheets of synthetic resin material overlying core 68 under pressure and concomitant pressurization of core 68 assures that the blade has a smooth outer surface and eliminates any tendency for the surface to exhibit a wrinkled configuration. This could occur by virtue of the fact that the composite skin is made up of a series of initially discrete synthetic resin sheets which in aggregation differ in effective thickness throughout the longitudinal length and the transverse width of the blade. In addition, pressurized curing of the resin layers backed up by a compressible foam core assures uniform flow of the resin as curing thereof takes place. Excessively rich resin areas are avoided throughout the extent of the blade. Resin starved areas are avoided due to the fact that the resin impregnated glass fiber sheets initially have fully wetted yarns and exact resin to glass ratios.

The thin sheet metal support strips such as 110, 112, 136, 140, 174, 186, 190, and 192 provide support for the synthetic resin sheets at the transition areas defined by adjacent stepped areas in the core 68 and prevent depressions in the skin along the stepped area transition lines which might otherwise occur.

The utilization of pre-prepared, flexible synthetic sheets reinforced with unidirectional glass fibers for the layers which become the internal part of the composite blade skin enhances the longitudinal strength of the blade, whereas the use of woven glass synthetic resin sheets as the outer part of the composite skin layer enhances the smoothness of the surface of the blade and bonds the fibers together in the transverse direction preventing undulations, protuberances, valleys, or other surface imperfections which would detract not only from the appearance or the blade but also its air moving characteristics by virtue of turbulence induced by such imperfections.

Upon removal of blade 30 from mold 204, it is necessary only to remove any excess material from the leading and trailing edges of the blade resulting from flash of synthetic resin material into the seam between adjacent mold cavities. Conventional grinding and surfacing procedures may be employed to accomplish clean-up of the edges of the blade. Weight such as lead shot or the like may also be added at this time in slot 107 for blade balancing purposes. In order to accomplish addition of the weight, the outermost top surface of the blade 30 may be opened to gain access to the slot 107 with the access hole being covered with suitable glass fiber reinforced synthetic resin material which is placed over the opening to the slot 107 to effect closure thereof.

Although a preferred blade is made up of a base polyester type resin, it is to be appreciated that an epoxy resin may be substituted for the polyester where inherently higher cost considerations do not militate against the use of epoxy. Similarly, vinyl esters, and other equivalent resins may be substituted for the preferred polyester composition.

We claim:

1. A molded, composite, airfoil defining, synthetic resin blade for large diameter cooling tower fans having a central hub and comprising:
   an elongated, relatively dense internal core of synthetic resin foam material;
   an elongated shank extending outwardly from one end of the foam core and adapted to be coupled to the fan hub; and
   an essentially laminar, monolithic reinforced skin of synthetic resin material overlying the foam core,
   said skin having been formed over the core as a plurality of pre-prepared, initially flexible fiberglass reinforced synthetic resin sheets with the core and skin thereover having been molded in a final desired configuration thereof under pressure and temperature conditions such that the core was compressed and the fiberglass reinforced sheets converted into said monolithic skin by virtue of curing of the laminar skin between the compressed core and the mold,
   said blade being provided with a relatively smooth outer surface and the core having a series of stepped areas which increase in height relative to the center of the core at respective steps as the normally outermost end of the blade remote from the shank is approached,
   a sufficient number of fiberglass reinforced synthetic resin sheets having been applied to the core to fill spaces between the outer surfaces of the core and the mold during curing of the resin whereby the skin is of greater thickness in a direction toward the shank end thereof.

2. A molded, composite, synthetic resin blade for large diameter cooling tower fans as set forth in claim 1, wherein said core originally was of a thickness such that the compression reduced the thickness dimension thereof to a degree that was correlated with the thickness of the laminar, monolithic skin over said core.

3. A molded, composite, synthetic resin blade for large diameter cooling tower fans as set forth in claim 2, wherein said core has been compressed such that the original thickness thereof between opposed major faces before compression was reduced from about 15% to about 40% of a combined thickness of the skin on opposed surfaces of the blade.

4. A molded, composite, synthetic resin blade for large diameter cooling tower fans as set forth in claim 3, wherein said thickness reduction of the core by compression is about 25% of the combined thicknesses of the skin on opposed surfaces of the blade.

5. A molded, composite, synthetic resin blade for large diameter cooling tower fans as set forth in claim 1, wherein the height of each of the stepped areas of the core relative to an adjacent area thereof was each originally from about 60% to about 85% of the thickness of the layers of synthetic resin immediately thereover.

6. A molded, composite, synthetic resin blade for large diameter cooling tower fans as set forth in claim 4, wherein said height of each of the stepped areas of the core originally was about 75% of the thickness of the synthetic resin layers thereover.

7. A molded, composite, synthetic resin blade for large diameter cooling tower fans as set forth in claim 1, wherein the core prior to compression during molding of the blade was of a thickness, and the blade was molded under conditions such that the final core thickness substantially satisfies the equations $$T_U = T_{A-B} - 0.75(t_A + t_B) \qquad [\text{I}]$$

$$T_C = T_{A-B} - (t_A + t_B) \qquad [\text{II}]$$

where
   $T_U$ = Uncompressed core thickness
   $T_{A-B}$ = Thickness of the final blade between selected directly opposed points on opposite major surfaces of the blade
   $t_A$ = Thickness of the skin at one of said opposed points on the final blade
   $t_B$ = Thickness of the skin at the other of said opposed points on the final blade
   $T_C$ = Final compressed core thickness.

8. A molded, composite, synthetic resin blade for large diameter cooling tower fans as set forth in claim 1, wherein the density of the core is from about 2½ to about 4 pounds per cubic foot.

9. A molded, composite, synthetic resin blade for large diameter cooling tower fans as set forth in claim 8, wherein the density of the core is about 3½ pounds per cubic foot.

10. A molded, composite synthetic resin blade for large diameter cooling tower fans as set forth in claim 1, wherein said core and the skin thereover have been molded in a longitudinally twisted final configuration.

11. A molded, composite synthetic resin blade for large diameter cooling tower fans as set forth in claim 1, wherein one of said sheets of pre-prepared, initially flexible synthetic resin material reinforced with glass fibers is oriented such that when applied to the core, the glass fibers primarily extended in a direction longitudinally of the blade.

12. A molded, composite, synthetic resin blade for large diameter cooling tower fans as set forth in claim 11, wherein one of said sheets of pre-prepared, initially flexible synthetic resin material reinforced with glass fibers is oriented such that when applied to the core, the glass fibers extended both longitudinally and transversely of the blade.

13. A molded, composite synthetic resin blade for large diameter cooling tower fans as set forth in claim 12, wherein the synthetic resin sheet having glass fibers which extend both longitudinally and transversely of the blade being is oriented outboard of the sheet having glass fibers which primarily extend longitudinally of the blade.

14. A molded, composite synthetic resin blade for large diameter cooling tower fans as set forth in claim 12, wherein said sheets include an outer synthetic resin veil augmented with fabric having fibers which extend both longitudinally and transversely of the core.

15. A molded, composite synthetic resin blade for large diameter cooling tower fans as set forth in claim 14, wherein said fabric comprised a relatively thin glass cross-fiber sheet.

16. A molded, composite synthetic resin blade for large diameter cooling tower fans as set forth in each of claims 11 and 12, wherein each of said sheets and the veil include a quantity of chopped fiberglass roving on the innermost face portions thereof.

17. A molded, composite synthetic resin blade for large diameter cooling tower fans as set forth in claim 1, wherein said shank is embedded in the foam core.

18. A molded, composite synthetic resin blade for large diameter cooling tower fans as set forth in claim 1, wherein the core is provided with two opposed stepped areas in alignment with the innermost end of the shank, and stepped areas on opposite sides of the core which increase in height in a direction away from the shank.

19. A molded, composite synthetic resin blade for large diameter cooling tower fans as set forth in claim 18, wherein the stepped areas on each side of the core increase in width in a direction away from the shank.

20. A molded, composite synthetic resin blade for large diameter cooling tower fans as set forth in claim 18, wherein the core is tapered and thereby decreases in thickness as the outermost extremity thereof is approached in a direction remote from the shank.

21. A molded, composite synthetic resin blade for large diameter cooling tower fans as set forth in claim 20, wherein is provided at least four stepped areas on opposite major faces of the core adjacent the shank, and at least two stepped areas located centrally of the core on opposed faces thereof.

22. A molded, composite synthetic resin blade for large diameter cooling tower fans as set forth in claim 14 wherein at least one of the sheets reinforced with glass fibers that extend both longitudinally and transversely of the blade upon application thereof to the core, wraps around a significant portion of the length of the leading edge of the blade.

23. A molded, composite synthetic resin blade for large diameter cooling tower fans as set forth in claim 11, wherein said sheet of synthetic resin reinforced with glass fibers which primarily extend in a direction longitudinally of the blade contained from about 30% to 40% by weight of resin and from about 60% to 70% by weight of glass fibers.

24. A molded, composite synthetic resin blade for large diameter cooling tower fans as set forth in claim 12, wherein said sheet of synthetic resin reinforced with glass fibers which extend both longitudinally and transversely of the blade contained from about 30% to 40% by weight of resin and from about 60% to 70% by weight of glass fibers.

25. A molded, composite synthetic resin blade for large diameter cooling tower fans as set forth in each of claim 1, wherein said laminar, monolithic skin is of a polyester resin.

26. A molded, composite synthetic resin blade for large diameter cooling tower fans as set forth in claim 25, wherein said polyester resin is an isophthalic polyester.

27. A molded, composite synthetic resin blade for large diameter cooling tower fans as set forth in claim 1, wherein said skin is also reinforced with random directional glass fibers.

28. A method of fabricating a molded, composite, airfoil-defining, synthetic resin blade for large diameter cooling tower fans having a central hub, said method comprising the steps of:
fabricating an elongated core of relative dense synthetic resin foam material and of dimensions generally equal to those of the final blade, and a thickness dimension which is generally equal to but somewhat greater than the thickness of the final blade,
said core fabricating step including forming depressions in the foam core defining a series of stepped areas therein of increasing height relative to the center of the core at respective steps as the normally outermost end of the fan blade is approached;
attaching an elongated shank to the core in disposition extending outwardly from the end thereof adapted to be coupled to the fan hub;
placing a skin over the core made up of a plurality of pre-prepared, flexible synthetic resin layers reinforced with glass fibers;
inserting the core with the glass reinforced synthetic resin sheets thereover in a mold having a cavity which conforms to a final desired configuration of the blade;
applying sufficient heat and pressure to the composite blade within the mold to cure the synthetic resin of the sheets while compressive forces are applied to the core to thereby form a laminar, essentially monolithic skin by virtue of curing of the synthetic resin sheets between the compressed core and the mold,
a sufficient number of fiberglass reinforced synthetic resin sheets being applied to the core to fill a spaces between the outer surfaces of the core and the mold during curing of the resins; and
removing the blade from the mold after curing of the synthetic resin material.

29. A method of fabricating a molded, composite, synthetic resin blade for large diameter cooling tower fans as set forth in claim 28, wherein is included the steps of configuring the mold, and fabricating a core of a thickness such that when the blade with the sheets of reinforced synthetic resin material thereover is placed in the mold, the thickness of the core is reduced by an amount correlated with the thickness of the laminar monolithic skin formed thereover by application of said heat and pressure to the blade.

30. A method of fabricating a molded, composite, synthetic resin blade for large diameter cooling tower fans as set forth in claim 29, wherein the size of the mold cavity and the thickness of the core are correlated such that the core is compressed to an extent that its thickness is reduced by an amount of from about 15% to about 40% of the combined thicknesses of the skin on opposite sides of the final blade.

31. A method of fabricating a molded, composite, synthetic resin blade for large diameter cooling tower fans as set forth in claim 29, wherein the size of the mold cavity and the thickness of the core are correlated such that the core is compressed to an extent that its thickness is reduced by an amount of about 25% of the combined thicknesses of the skin on opposite sides of the final blade.

32. A method of fabricating a molded, composite, synthetic resin blade for large diameter cooling tower fans as set forth in claim 29, wherein the size of the mold cavity and the thickness of the core are correlated such that the uncompressed core thickness and final compressed core thickness satisfy the equations $$T_U = T_{A-B} - 0.75(t_A + t_B) \quad [I]$$

$$T_C = T_{A-B} - (t_A + t_B) \quad [II]$$

where
- $T_U$ = Uncompressed core thickness,
- $T_{A-B}$ = Thickness of the final blade between selected directly opposed points on opposite major surfaces of the blade,
- $t_A$ = Thickness of the skin at one of said opposed points on the final blade,
- $t_B$ = Thickness of the skin at the other of said opposed points on the final blade,
- $T_C$ = Final compressed core thickness.

33. A method of fabricating a molded, composite, synthetic resin blade for large diameter cooling tower fans as set forth in claim 28, wherein is included the steps of forming depressions in the foam core of a depth such that the step to the next adjacent depression in a direction longitudinally of the blade is approximately equal to the thickness of one of the synthetic resin sheets.

34. A method of fabricating a molded, composite, synthetic resin blade for large diameter cooling tower fans as set forth in claim 28, wherein is included the steps of applying pre-prepared, flexible synthetic resin material sheets to the core of dimensions such that at least one of the sheets wraps around the leading edge of the blade along the longitudinal length thereof.

35. A method of fabricating a molded, composite, synthetic resin blade for large diameter cooling tower fans as set forth in claim 34 wherein said synthetic resin material is a chemically thickened polyester.

36. A method of fabricating a molded, composite, synthetic resin blade for large diameter cooling tower fans as set forth in claim 34, wherein said synthetic resin material is an isophthalic polyester.

37. A method of fabricating a molded, composite, synthetic resin blade for large diameter cooling tower fans as set forth in claim 28, wherein said temperature is of the order of 250° F. to 350° F.

38. A method of fabricating a molded, composite, synthetic resin blade for large diameter cooling tower fans as set forth in claim 28, wherein said blade is subjected to said temperature for a time of about 25 to 60 minutes.

39. A method of fabricating a molded, composite, synthetic resin blade for large diameter cooling tower fans as set forth in claim 28, wherein said pressure applied to the composite core and synthetic resin sheets is of the order of about 125 psi to 225 psi.

40. A method of fabricating a molded, composite, synthetic resin blade for large diameter cooling tower fans as set forth in claim 28, wherein is included the step of applying an outer synthetic resin veil over said sheets prior to insertion of the core with the cover thereover in said mold.

41. A method of fabricating a molded, composite, synthetic resin blade for large diameter cooling tower fans as set forth in claim 40, wherein said veil is augmented with a glass cross-fiber material.

* * * * *